(12) United States Patent
Yang et al.

(10) Patent No.: US 10,550,885 B2
(45) Date of Patent: Feb. 4, 2020

(54) COMPRESSOR

(71) Applicants: LG ELECTRONICS INC., Seoul (KR); SEOUL NATIONAL UNIVERSITY R&DB FOUNDATION, Seoul (KR)

(72) Inventors: Eunsoo Yang, Seoul (KR); Bumdong Sa, Seoul (KR); Byeongchul Lee, Seoul (KR); Eunsoo Park, Seoul (KR); Wookha Ryu, Seoul (KR)

(73) Assignees: LG ELECTRONICS INC., Seoul (KR); SEOUL NATIONAL UNIVERSITY R&D FOUNDATION, Seoul (KR)

(*) Notice: Subject to any disclaimer, the term of this patent is extended or adjusted under 35 U.S.C. 154(b) by 153 days.

(21) Appl. No.: 15/156,418

(22) Filed: May 17, 2016

(65) Prior Publication Data
US 2016/0341249 A1 Nov. 24, 2016

(30) Foreign Application Priority Data

May 18, 2015 (KR) .................. 10-2015-0069038

(51) Int. Cl.
| | |
|---|---|
| *F16C 33/62* | (2006.01) |
| *F16C 33/06* | (2006.01) |
| *F16C 33/12* | (2006.01) |
| *F16C 33/10* | (2006.01) |
| *F25B 31/00* | (2006.01) |

(Continued)

(52) U.S. Cl.
CPC .......... *F16C 33/1095* (2013.01); *F04C 29/02* (2013.01); *F25B 31/002* (2013.01); *F25B 31/026* (2013.01)

(58) Field of Classification Search
CPC ........ F16C 33/06; F16C 33/12; F16C 33/121; F16C 33/125; F16C 33/62
USPC ......................................... 418/178, 179, 182
See application file for complete search history.

(56) References Cited

U.S. PATENT DOCUMENTS

| | | | |
|---|---|---|---|
| 3,409,966 A * | 11/1968 | Hilbish ................... | F16C 33/12 29/423 |
| 4,820,140 A * | 4/1989 | Bishop .................... | F01C 21/08 384/279 |
| 6,773,817 B1 | 8/2004 | Sagel et al. | |

(Continued)

FOREIGN PATENT DOCUMENTS

| | | |
|---|---|---|
| CN | 1916419 | 2/2007 |
| CN | 101407905 | 4/2009 |

(Continued)

OTHER PUBLICATIONS

Chinese Office Action dated Sep. 29, 2017 issued in Application No. 201610251622.0 (with English Translation).
Chinese Office Action dated Sep. 4, 2018 (English Translation).

*Primary Examiner* — Deming Wan
(74) *Attorney, Agent, or Firm* — Ked & Associates LLP

(57) ABSTRACT

A lubricating layer having wear resistance and reliability on the wear resistance, and a compressor including a lubricating layer are provided. The compressor may include a lubricating layer coated on a frictional portion between a rotational shaft and a bearing. The lubricating layer may include at least one metal phase selected from a group consisting of Titanium (Ti); and Copper (Cu), Cobalt (Co), Nickel (Ni), and Zirconium (Zr), and may be a composite structure of amorphous and nanocrystalline materials.

14 Claims, 10 Drawing Sheets

(51) Int. Cl.
*F25B 31/02* (2006.01)
*F04C 29/02* (2006.01)

(56) References Cited

U.S. PATENT DOCUMENTS

| | | | | |
|---|---|---|---|---|
| 2003/0198417 | A1* | 10/2003 | Yamamoto | F16C 29/005 |
| | | | | 384/492 |
| 2007/0042218 | A1* | 2/2007 | Lang | C23C 24/04 |
| | | | | 428/660 |
| 2008/0025861 | A1* | 1/2008 | Okawa | C10M 107/38 |
| | | | | 418/178 |
| 2008/0070815 | A1* | 3/2008 | Kamada | C10M 169/04 |
| | | | | 508/107 |
| 2011/0142384 | A1* | 6/2011 | Hofmann | C23C 30/005 |
| | | | | 384/42 |
| 2011/0220415 | A1* | 9/2011 | Jin | C23C 14/024 |
| | | | | 175/57 |
| 2013/0171367 | A1* | 7/2013 | Kusinski | B05D 5/083 |
| | | | | 427/447 |

FOREIGN PATENT DOCUMENTS

| | | |
|---|---|---|
| CN | 102124238 | 7/2011 |
| CN | 103666665 | 3/2014 |
| CN | 104060230 | 9/2014 |
| CN | 104313530 | 1/2015 |
| JP | 2012-122498 | 6/2012 |
| JP | 2013-053693 | 3/2013 |
| KR | 10-0667388 | 1/2007 |
| KR | 10-1474466 | 12/2014 |
| WO | WO 2014056605 | 4/2014 |

\* cited by examiner

COMPRESSOR

CROSS-REFERENCE TO RELATED APPLICATION(S)

Pursuant to 35 U.S.C. § 119(a), this application claims priority to Korean Application No. 10-2015-0069038, filed in Korea on May 18, 2015 the contents of which is incorporated by reference herein in its entirety.

BACKGROUND

1. Field

A compressor is disclosed herein.

2. Background

Compressors may be divided into a reciprocating type, a rotary type, and a scroll type, for example, according to a method of compressing a refrigerant. The reciprocating compressor uses a method of compressing the refrigerant while a piston drive linearly moves a piston. The rotary compressor uses a method of compressing the refrigerant using a rolling piston to perform an eccentric rotational movement in a compression space of a cylinder and a vane adjacent to the rolling piston to partition the compression space of the cylinder into a suction chamber and a discharge chamber. The scroll compressor is a compressor in which a fixed scroll is fixed to an inner space of a hermetic container, and an orbiting scroll is engaged with the fixed scroll to consecutively form a pair of two compression chambers having a suction chamber, an intermediate pressure chamber, and a discharge chamber between a fixed wrap of the fixed scroll and an orbiting wrap of the orbiting scroll while performing an orbiting movement.

In particular, a compressor operating based on rotation of a component, such as a rotary compressor or scroll compressor, uses a bearing to reduce a frictional resistance with respect to a rotational shaft. Moreover, the compressor uses a lubricating film to reduce a frictional resistance between the rotational shaft and the bearing.

A friction and wear reduction method using a solid lubricating film for the role of coating is a method of depositing a solid-phase material having excellent friction and wear characteristics with a thickness below several micrometers (μm) on both or one frictional surface of mechanical components in contact with each other and performing a relative movement to enhance tribology characteristics of frictional surface, thereby reducing friction and wear.

Operating conditions of mechanical components continue to be harsh according to higher speed and smaller sizes of compressors, and thus, the importance of the friction and wear reduction method using a solid lubricating film has increased. Accordingly, it is required to select a solid lubricating film suitable for mechanical components to reduce a frictional loss of a mechanical system, increase a lifespan of the mechanical system, and maximize an effect of operational reliability enhancement of the mechanical system. In particular, in order to allow a compressor designed with a high speed and smaller size condition to exhibit an efficiency equal to or higher than an efficiency of a large-sized compressor, it is necessary to perform a redesign to prevent deterioration even in harsh operating conditions.

Surface temperatures of a bearing may be maintained above about 100° C. in a high temperature and overload condition of the compressor, and characteristics of wear and friction may be excessive due to a break down in an oil film. As a result, among the related arts, diamond like carbon (DLC), which is a high hardness, wear resistant, and friction material, has been applied to a substitute material of manganese based coating salt. It has been determined that DLC has a loss reduction of above 30% compared to lubrite coating, but there is a limit in the characteristic enhancement at low speeds due to a low affinity to an additive to an oil used for compressors. Further, the lower frictional characteristic of a manganese based coating salt in the related art is maintained by self exhaustion compared to a high hardness, low friction material, and thus there is a limit in the reliability and efficiency enhancement of wear resistance in harsh operating conditions.

Accordingly, technological development of compressors beyond the technical limitations in the related art with enhanced frictional characteristics is required.

BRIEF DESCRIPTION OF THE DRAWINGS

Embodiments will be described in detail with reference to the following drawings in which like reference numerals refer to like elements, and wherein.

DETAILED DESCRIPTION

Figure 1:
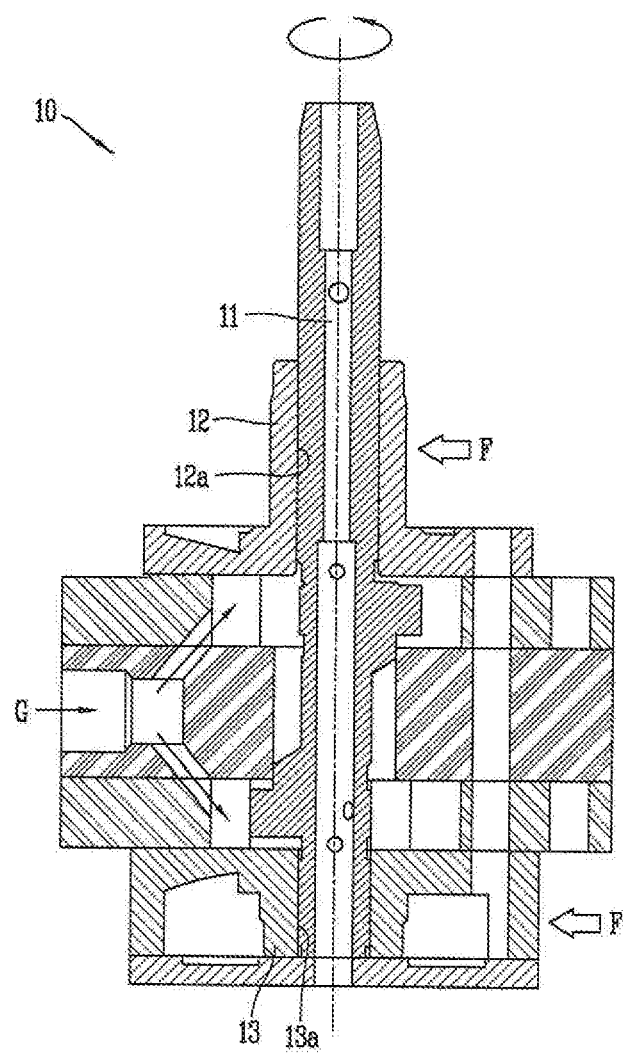
FIG. 1 is a partial cross-sectional view illustrating a compressor according to an embodiment.

FIG. 1 is a partial cross-sectional view illustrating a compressor according to an embodiment. The compressor 10 may be various types according to a method of compressing a refrigerant. Among various types of compressors 10, the compressor 10 with a structure of using rotation of a rotational shaft 11 may include bearings 12, 13 to reduce frictional resistance of a component in contact with the rotational shaft 11, FIG. 1 illustrates the compressor 10 in a shape using the rotational shaft 11 and bearings 12, 13.

The rotational shaft 11 may be rotated to compress a gas during operation of the compressor 10. Further, the bearings 12, 13 may be configured to surround at least a portion of the rotational shaft 11. The bearings 12, 13 may be fixed, but capable of moving relatively with respect to the rotational shaft 11. The bearings 12, 13 may include a main bearing 12 (or first bearing), and a sub-bearing 13 (or second bearing).

When the compressor 10 operates, gas may be inhaled from one side of the rotational shaft 11 while the rotational shaft 11 rotates. Further, a reaction force (F) may be formed in an opposite direction to a gas force (G) due to the inhaled gas. Accordingly, the rotational shaft 11 may be consistently in contact with the bearings 12, 13 while the rotational shaft 11 rotates.

A lubricating layer may be formed on a frictional portion 12a, 13a between the rotational shaft 11 and the bearings 12, 13 to provide wear resistance and low friction. The lubricating layer may be deposited on at least one of the rotational shaft 11 or the bearing 12, 13.

Characteristics of a lubricating layer to be improved according to embodiments disclosed herein to enhance performance of the compressor 10 are durability, low friction, heat resistance, and conditioning characteristics. A lubricating layer according to embodiments disclosed herein, which will be described hereinbelow, may be formed to satisfy the foregoing performance.

Figure 2:
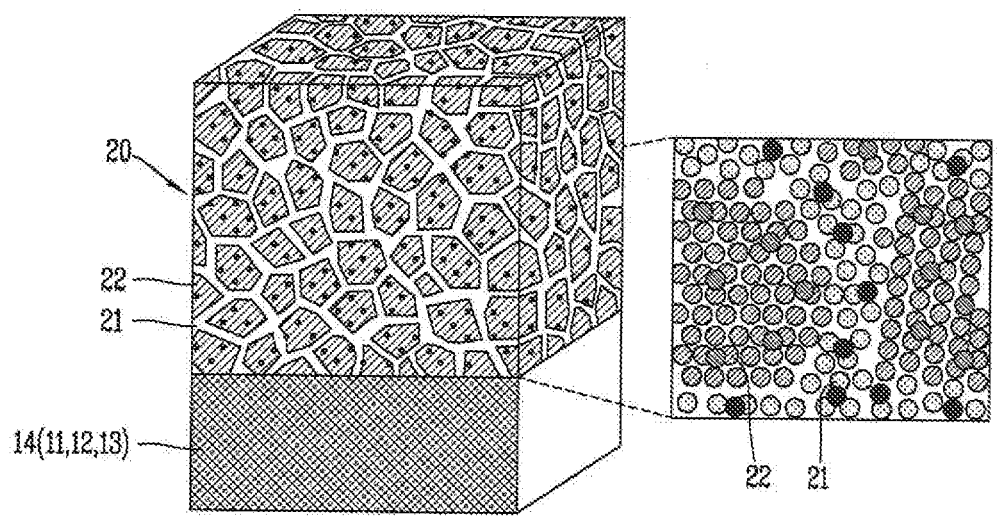
FIG. 2 is a conceptual view for explaining a lubricating layer according to an embodiment of an amorphous structure and a nanocrystalline structure.

FIG. 2 is a conceptual view for explaining a lubricating layer 20 according to embodiments disclosed herein of an amorphous material 21 and a nanocrystalline material 22. The lubricating layer 20 may be formed on a frictional portion between the rotational shaft 11 and the bearings 12, 13. FIG. 2 illustrates lubricating layer 20 and a base material 14 of the rotational shaft 11 and bearings 12, 13, on which the lubricating layer 20 may be formed. The base material 14 (11, 12, 13) coated with the lubricating layer 20 may include at least one of an alloy containing steel, cast iron, and aluminium, or an alloy containing magnesium. The alloy containing steel, cast iron, and aluminium, and the alloy containing magnesium may promote the amorphous formation of the lubricating layer 20 with rapid cooling through fast thermal conduction during coating.

The lubricating layer 20 according to embodiments disclosed herein may include a composite structure of the amorphous material 21 and the nanocrystalline material 22. The amorphous material 21 refers to a material in which a component element has a uniform composition while having a non-periodic atomic structure, such as a liquid. The amorphous material 21 typically has a larger hardness than a hardness of a crystalline material, a relatively smaller elastic coefficient than an elastic coefficient of the crystalline material, and a larger elastic strain than an elastic strain of the crystalline material due to the absence of a defective area, such as grain boundaries.

Unless interfacial elastic properties between the base material 14 and the lubricating layer 20 are similar to each other, the lubricating layer 20 may be easily peeled off from the base material 14, or the lubricating layer 20 may be broken due to the effect of residual stress among strains. Any inconsistency between the elastic properties denotes a large difference between the base material 14 and the lubricating layer 20. In general, lubricating layers in the related art mostly form a hardened ceramic phase to have a large elastic coefficient. Accordingly, lubricating layers in the related art have a large elastic coefficient difference from an elastic layer of the base material 14 even though precipitating soft crystalline substances, and thus, exhibit low interfacial stability even though initial lubrication performance is superior. Lubricating layers in the related art are easily peeled off from the base material or destroyed, and thus, do not have sufficient sustainability. The occurrence of the peeling or destruction of the lubricating layer 20 means that the durability (reliability on wear resistance) of the lubricating layer 20 is low.

In contrast, the lubricating layer 20 according to embodiments disclosed herein is formed of a material and composition having a forming ability of the amorphous material 21, and thus, forms a composite structure of the amorphous material 21 and the nanocrystalline material 22. The peeling or destruction of the lubricating layer occurs due to inconsistency of interfacial elastic properties for mechanical properties) between the base material and the lubricating layer, and the lubricating layer 20 according to embodiments disclosed herein containing the amorphous material 21 may have a high hardness and lower elastic coefficient value compared to the hardness and elastic coefficient value of a crystalline alloy, thereby minimizing the peeling or destruction of the lubricating layer 20 even though a hardened film is formed though a nitride and/or carbide ceramic precipitation phase. Accordingly, the lubricating layer 20 according to embodiments disclosed herein has a high durability (reliability on wear resistance) compared to lubrication materials in the related art.

A crystalline material is a material in which an arrangement of atoms has a repetitive long range order within a lattice structure. Further, the nanocrystalline material 22 is a material in which an average size of crystal grains is within a range between several nanometers to several hundreds of nanometers. The crystalline material may have a relatively smaller hardness value than a hardness value of the amorphous material 21, but have a larger hardness value than the hardness value of the amorphous material 21 when intermetallic compounds are precipitated.

The lubricating layer 20 may include at least one metal phase selected from a group consisting of Copper (Cu), Cobalt (Co), Nickel (Ni), and Zirconium (Zr). Cu, Co, Ni, and Zr constitute an element group for forming a negative heat of mixing relationship with respect to Titanium (Ti) to have an excellent glass forming ability. Cu, Co, Ni, and Zr may provide an excellent elastic strain with a relatively high hardness and low elastic coefficient when formed as the amorphous material 21.

The lubricating layer 20 according to embodiments disclosed herein has a composite structure of the amorphous material 21 and the nanocrystalline material 22, and thus, makes up for the hardness reduction of the lubricating layer 20. A nanocrystallized soft metal may make up for the hardness characteristics of the lubricating layer 20 through structuralization of fine crystal grains. As the nanocrystalline material 22 makes up for the hardness characteristics of the lubricating layer 20, it may be possible to enhance the hardness and wear resistance of the lubricating layer 20.

In addition, a soft metal may improve conditioning characteristics of the lubricating layer 20. The lubricating layer 20 formed (deposited) on the base material 14 may not immediately exhibit inherent lubrication performance, but may exhibit inherent lubrication performance when having undergone an operation process to some extent. Conditioning indicates an operation process which should have been undergone until prior to exhibiting inherent lubrication performance. Excellent conditioning characteristics may mean that a conditioning time is relatively short, and in contrast, bad conditioning characteristics ray mean that the conditioning time is relatively long.

Soft metal may provide a large elastic strain compared to an elastic strain of a hard metal, thereby enhancing the conditioning characteristics of the lubricating layer 20. Accordingly, it may be possible to reduce the conditioning time of the lubricating layer 20.

The lubricating layer 20 according to embodiments disclosed herein may include at least one metal phase selected from a group consisting of (a) Ti and (b) Cu, Co, Ni, and Zr. The amorphous material 21 and nanocrystalline material 22 of the lubricating layer 20 may be formed with a same composition as a composition of a same material. However, the compositions of the amorphous material 21 and nanocrystalline material 22 may not be necessarily the same.

For example, in contrast to the amorphous material 21, the nanocrystalline material 22 may further include (d1) Nitrogen (N) and/or (d2) Carbon (C). N forms Ti nitride along with Ti. The Ti nitride includes TiC. C forms Ti carbide along with Ti. The Ti carbide includes TiC. When the nanocrystalline material 22 includes N and C together, N and C form TiNC along with TiC. TiN, TiC, or TiNC provides high hardness characteristics to the lubricating layer 20. Since N and C form a crystalline material, the effect of N and C within a base of the amorphous material 21 is insignificant.

The composite structure of the lubricating layer 20 is formed of the amorphous material 21 and the nanocrystalline material 22. Incidentally, as illustrated in FIG. 2, the nanocrystalline material 22 may fill a space between bases of the amorphous material 21 due to crystalline precipitation during formation of the amorphous material. In contrast, the amorphous material 21 and the nanocrystalline material 22 may be sequentially deposited on the base material 14 (11, 12, 13) to form a composite structure of the lubricating layer 20.

Figure 3:
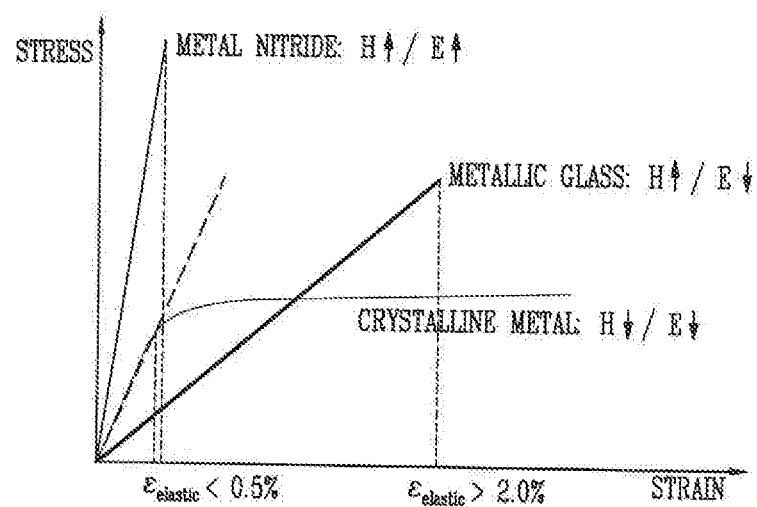
FIG. 3 is a stress-strain diagram in which a metallic glass is compared to a metal nitride and a crystalline metal.

FIG. 3 is a stress-strain diagram in which a metallic glass is compared to a metal nitride and a crystalline metal. Stress indicates a resistance force generated within a material when an external force is applied to the material. Strain indicates a ratio of an amount of strain generated on a material and a length of an inherent material. A slope on the stress-strain diagram corresponds to an elastic coefficient.

The durability (reliability on wear resistance) of the lubricating layer may be evaluated by a ratio (HIE) of a hardness (H) and an elastic coefficient (E). Having a relatively large ratio of the hardness and the elastic coefficient denotes a low possibility of peeling or destruction due to high durability of the lubricating layer.

Metal nitride has a very high hardness. However, the metal nitride has a high elastic coefficient as seen from a slope of a graph illustrated in FIG. 3. Further, the metal nitride has a low elastic strain below 0.5%. As a result, the metal nitride may form a lubricating layer with a high hardness due to the relatively high hardness thereof, whereas it has difficulties in securing durability due to the relatively high elastic coefficient.

A crystalline metal has a very lower elastic coefficient as seen from the slope of the graph illustrated in FIG. 3. However, the crystalline metal has a low elastic strain below 0.5% similar to the metal nitride. A hardness of the crystalline metal has a very low hardness compared to the hardness of the metal nitride. As a result, the crystalline metal may secure the durability of the lubricating layer due to the low elastic coefficient, whereas it is difficult to form a lubricating layer with a high hardness due to the relatively low hardness.

As shown in the result of the metal nitride and the crystalline metal, in general, if the hardness increases, the elastic coefficient tends to increase. In contrast, if the elastic coefficient decreases, the hardness also tends to decrease at a same time. Accordingly, it is difficult to significantly enhance a ratio of the hardness and the elastic coefficient. This means that it is difficult to secure the durability of a lubricating layer with a high hardness through a high hardness and low elastic coefficient. However, embodiments disclosed herein may implement a high hardness and low elastic coefficient through a composite structure of an amorphous material and a nanocrystalline material.

The hardness of a metallic, glass has a lower hardness than the hardness of a metal nitride, but has a higher hardness than the hardness of the crystalline metal. Referring to FIG. 3, the elastic coefficient of the metallic glass is very low compared to the elastic coefficient of the crystalline metal or metal nitride. Further, as an elastic strain of the metallic glass is above 1.5% the metallic glass exhibits a wide elastic limitation to perform a buffer role between a lubricating layer and a friction material.

Accordingly, in contrast to the foregoing general tendency described above, the metallic glass has a high hardness, a low elastic coefficient and a high elastic strain. As a result, a ratio (H/E) of a hardness (H) and an elastic coefficient (E) of the metallic glass has a large value compared to the crystalline metal or metal nitride. Consequently, a lubricating layer using a metallic glass has an advantage of having reliability on wear resistance (durability) as well as wear resistance.

The lubricating layer according to embodiments disclosed herein may include at least one metal phase selected from a group consisting of (a) Ti and (b) Cu, Co, Ni and Zr, and has a composite structure of amorphous and nanocrystalline materials. Ti strengthens a hardness of the lubricating layer. In particular, the lubricating layer may further include N and C, and thus, Ti forms TiN, TiC or TiNC along with N and/or C. As described above, the metal nitride and metal carbide have a very high hardness.

Figure 4:
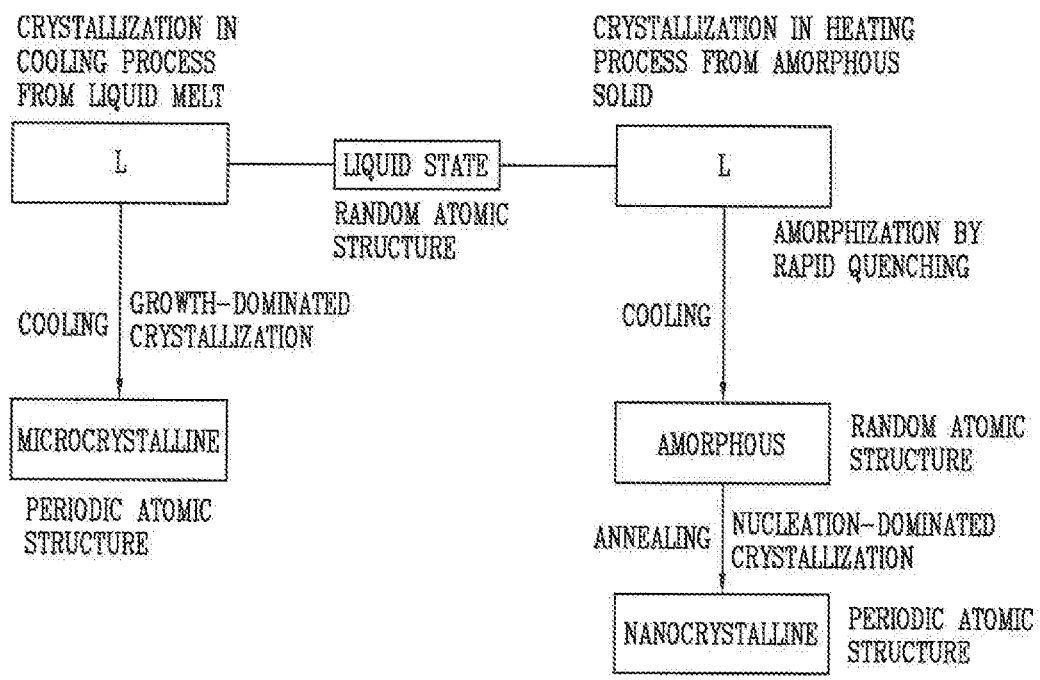
FIG. 4 is a conceptual view for explaining a glass forming ability.

FIG. 4 is a conceptual view for explaining a glass forming ability. Glass forming ability (GFA) means how easily an alloy with a specific composition can be amorphized. The glass forming ability of a metal or alloy mainly depends on a composition thereof.

The lubricating layer according to embodiments disclosed herein has a composite structure of amorphous and nanocrystalline materials. The amorphous material may be formed by a composition having a glass forming ability.

The amorphous and nanocrystalline materials should be distinguished from a microcrystalline material. Hereinafter, a formation process of a microcrystalline material will be described first, and then a formation process of amorphous and nanocrystalline materials will be described.

A liquid metal has a random atomic structure. Crystallization occurs by a process of cooling a liquid metal. The crystallization at this time is classified as growth-dominated crystallization. A crystalline structure formed by the crystallization of a liquid metal is a microcrystalline material. The microcrystalline material has a periodic atomic structure. An average size of crystal grains in the microcrystalline material exists within a range between several micrometers (μm) to several hundreds of micrometers (μm).

In contrast, in case of an alloy composition having an excellent glass forming ability, it may be easily undercooled due to having a relatively stable liquid phase structure during the cooling of a liquid metal. Accordingly, an alloy composition having a glass forming ability forms an amorphous solid or forms a nanocrystalline phase in which an average size thereof exists within a range between several nanometers to several hundreds of nanometers through a nucleation-dominated crystallization process.

A composition having an excellent glass forming ability may form a nanocrystalline material through annealing as well as amorphization. Embodiments disclosed herein may have a composite structure of amorphous and nanocrystalline materials, and the amorphous and nanocrystalline materials may be formed by a composition having a glass forming ability.

A lubricating layer according to embodiments disclosed herein may include at least one metal phase selected from a group consisting of (a) Ti and (b) Cu, Co, Ni, and Zr. The metal phase may be selected according to a characteristic of the lubricating layer desired to be enhanced. In contrast, the lubricating layer may always include Ti.

Ti is an active metal with strong reducibility. As Ti is a high hardness material, the hardness of the lubricating layer may be enhanced by Ti. Even in a case of a lubricating layer having a high hardness, when interfacial elastic properties thereof do not correspond to those of a base material, destruction and peeling of the lubricating layer may occur. In the above, it has been described that the lubricating layer according to embodiments disclosed herein is formed of a composition having a glass forming ability.

A composition having a glass forming ability may have a wide range. A too narrow composition range may not have a sufficient glass forming ability as well as difficulties in enhancing characteristics varying by composition.

Hereinafter a range of composition having a glass forming ability of a Ti-based binary alloy will be described.

Figure 5:
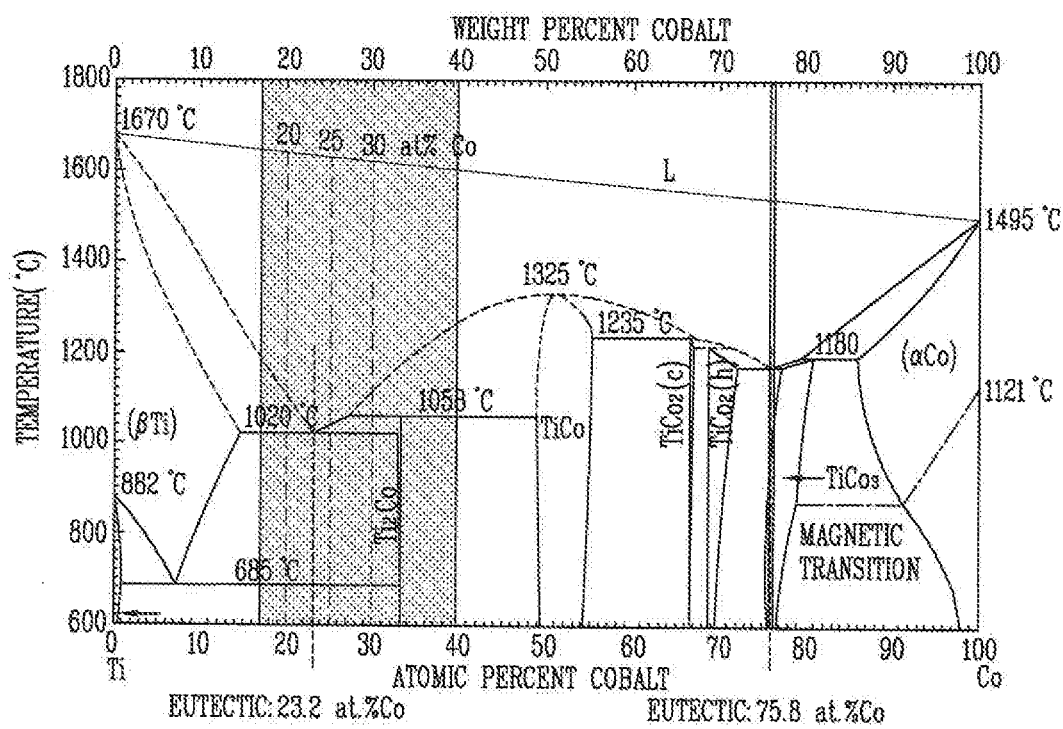
FIG. 5 is a phase diagram of Titanium (Ti) and Cobalt (Co) for explaining a composition range of glass forming ability of a binary alloy of Ti and Co.

FIG. 5 is a phase diagram of Ti and Co for explaining a composition range of glass forming ability of a binary alloy of Ti and Co. A composition having a glass forming ability of a binary alloy has a relatively large ratio ($\Delta T^*$) of an actual melting point to its ideal melting point estimated based on a melting point of each element (rule of mixture), and thus, may be determined within a range including a eutectic point having a most outstanding, stability of the liquid phase. Referring to the phase diagram, a eutectic point of Ti and Co is 23.2 at. % Co, 75.8 at. % Co.

A composition range capable of having a glass forming ability above with the $\Delta T^*$ value above 0.2 in a binary alloy of Ti and Co is shown with a shaded area. A binary alloy of Ti and Co may have a glass forming ability between 17 and 40 at. % Co including 23.2 at. % Co, which is one of eutectic points, and may also have a glass forming ability at around 23.2 at. % Co which is another eutectic point.

Figure 6:
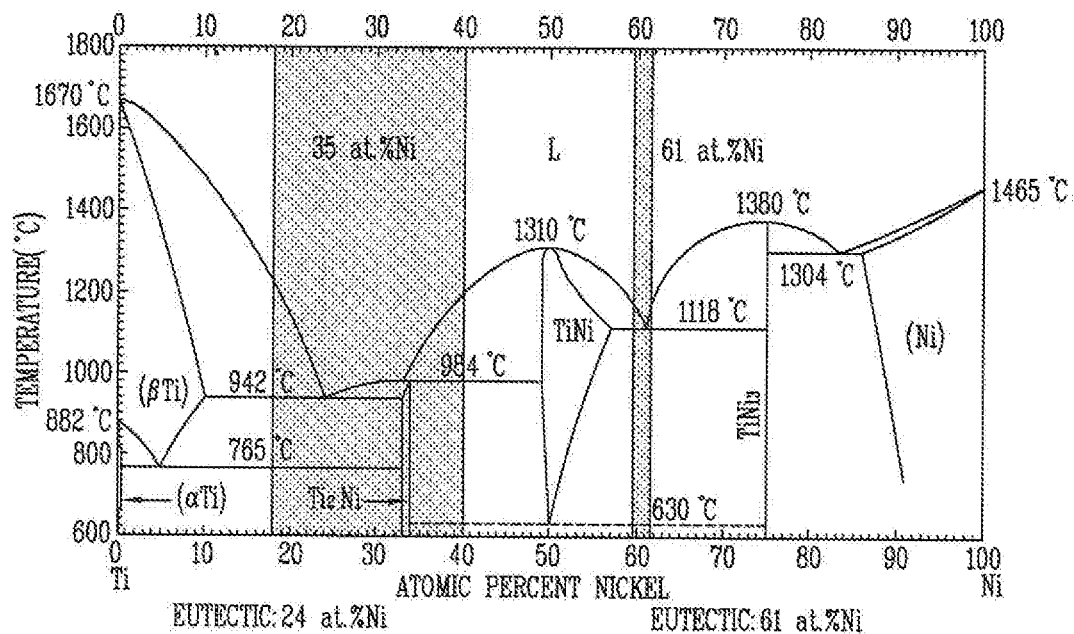
FIG. 6 is a phase diagram of Ti and Nickel (Ni) for explaining a composition range of glass forming ability of a binary alloy of Ti and Ni.

FIG. 6 is a phase diagram of Ti and Ni for explaining a composition range of the glass forming ability of a binary alloy of Ti and Ni. Referring to the phase diagram, a eutectic point of Ti and Ni is 24 at. % Ni 61 at. % Ni.

A composition range capable of having a glass forming ability above with the $\Delta T^*$ value above 0.2 in a binary alloy of Ti and Ni is shown with a shaded area. A binary alloy of Ti and Ni may have a glass forming ability between 18 and 40 at. % Ni including 24 at. % Co, in which is one of eutectic points, and may also have a glass forming ability at around 61 at. % Ni, which is another eutectic point.

Figure 7:
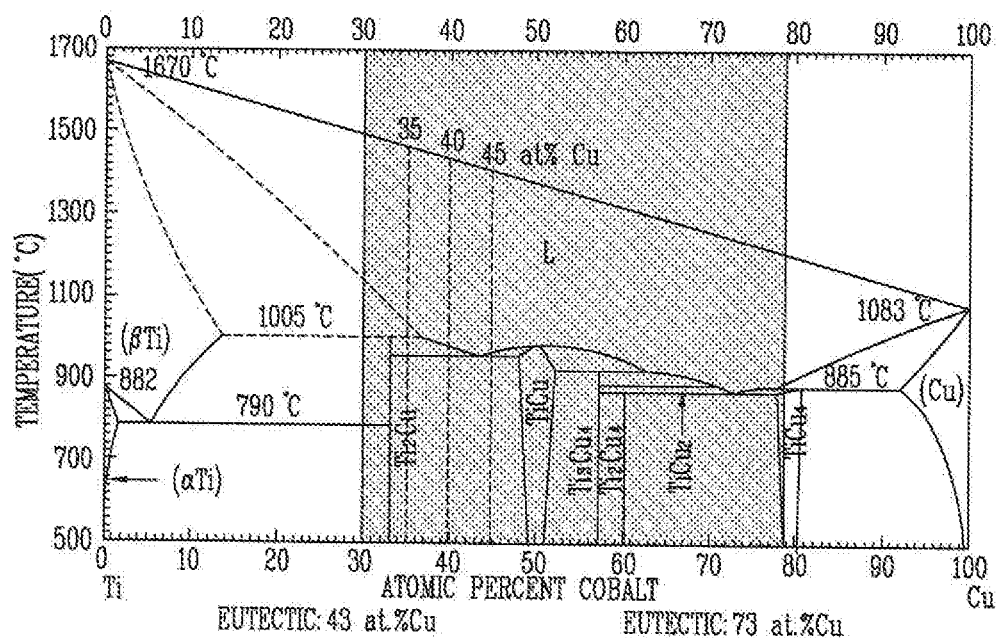
FIG. 7 is a phase diagram of Ti and Copper (Cu) for explaining a composition range of glass forming ability of a binary alloy of Ti and Cu.

FIG. 7 is a phase diagram of Ti and Cu for explaining a composition range of glass forming ability of a binary alloy of Ti and Cu. Referring to the phase diagram, a eutectic point of Ti and Ni is 43 at. % Cu, 73 at. % Cu.

A composition range capable of having a glass forming ability above with the $\Delta T^*$ value above 0.2 in a binary alloy of Ti and Cu is shown with a shaded area. A binary alloy of Ti and Cu may have a glass forming ability between 30 and 78 at. % Cu including two eutectic points.

Comparing the phase diagrams of FIGS. 5 through 7, it is seen that a binary alloy of Ti and Cu has the most wide range of glass forming ability. Accordingly, comparing only the glass forming abilities of soft metals excluding other characteristics thereof, it is preferable that the lubricating layer according to embodiments disclosed herein includes Ti and Cu.

An amorphous material should be distinguished from a glass forming ability. Having a glass forming ability means being able to be an amorphous material, but does not necessarily mean being formed of an amorphous material. As described above about the amorphous and nanocrystalline materials, it may be possible to form an amorphous material or nanocrystalline material according to the process even with the same composition.

Whether or not an amorphous material is actually formed within a range of composition having a glass forming ability may be checked by implementing an X-ray diffraction analysis on a binary alloy with a composition having a glass forming ability. Hereinafter, a process of implementing an X-ray diffraction analysis on a binary alloy with a composition having a glass forming ability to verify whether or not an amorphous material was formed will be described.

Figure 8:
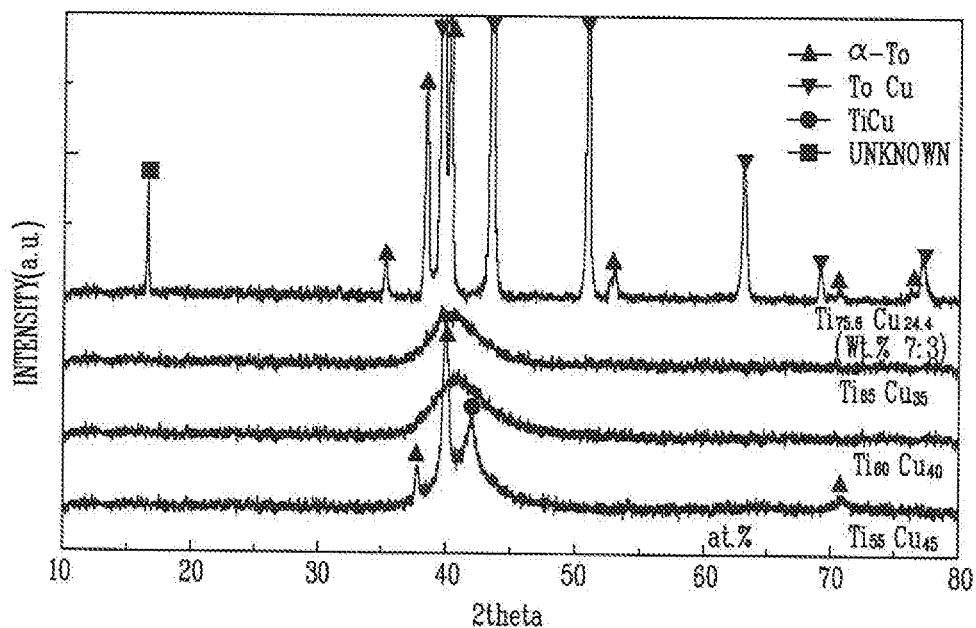
FIG. 8 is a X-ray diffraction analysis result for checking whether a binary alloy of Ti and Cu forms an amorphous material.

FIG. 8 is a X-ray diffraction analysis result for checking whether a binary alloy of Ti and Cu forms an amorphous material. The compositions of Ti and Cu under X-ray diffraction analysis were set as follows.

(1) Composition 1: Ti:Cu=75.6:24.4 (at. %)
(2) Composition 2: Ti:Cu=65:35 (at. %)
(3) Composition 3: Ti:Cu=60:40 (at. %)
(4) Composition 4: Ti:Cu=55:45 (at. %)

Viewing a result of composition 1, it is seen from peaks that a crystalline material α-Ti phase and an intermetallic compound Ti3Cu were formed. Results of compositions 2 and 3 do not exhibit any peak and thus, it is seen that a crystalline material was not formed but an amorphous material was formed in the compositions 2 and 3. Viewing result of composition 4, it is seen from peaks that a crystalline material α-Ti phase and an intermetallic compound TiCu were formed.

Accordingly, as a result of the X-ray diffraction analyses of compositions 1 through 4, a composition having a glass forming ability of a binary alloy of Ti and Cu may be selected from a range of Ti:Cu=55:45 at. % to Ti:Cu=75.8:24.4 at. %. A composition having a glass forming ability of a binary alloy of Ti and Cu in a durability aspect of a lubricating layer may be selected from a range of Ti:Cu=80:40 at. % to Ti:Cu=85:35 at. %. An intermetallic compound may act as a defect when placed under a load, and thus, it may be difficult to sufficiently secure the durability of the lubricating layer.

Figure 9:
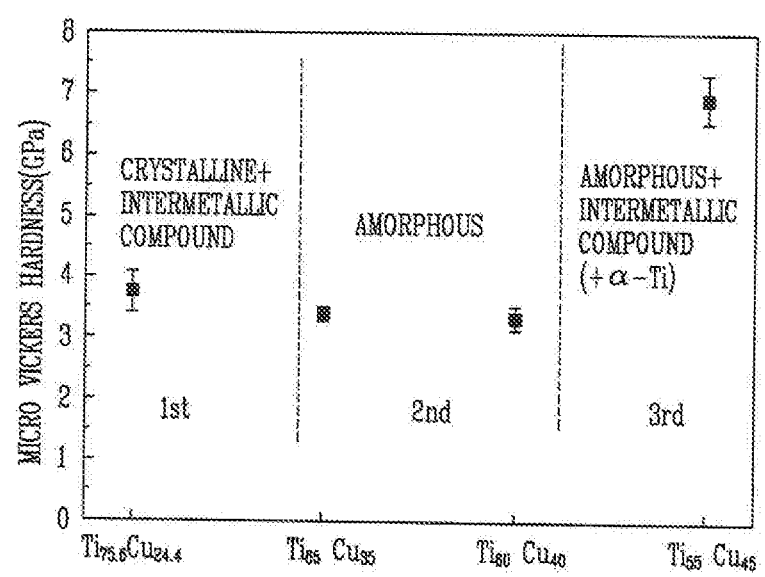
FIG. 9 is a graph illustrating a hardness according to a composition of Ti and Cu in which an analysis has been carried out in FIG. 8.

FIG. 9 is a graph illustrating a hardness according to a composition of Ti and Cu in which an analysis has been carried out in FIG. 8. It is seen from the graph that compositions 2 and 3 having a glass forming ability have a lower hardness compared to compositions 1 and 4 containing a crystalline material. Through this, it is seen that a lubricating layer consisting only of an amorphous material does not have a sufficient hardness. Accordingly, it is required to enhance a low hardness of the amorphous material.

A hardness of the lubricating layer may be enhanced by a nanocrystalline material. In the above description of FIG. 2, it has been described that the hardness characteristics of a lubricating layer can be made up for through a composite structure with the nanocrystalline material. The lubricating layer according to embodiments disclosed herein may further include a doping element other than at least one metal phase selected from a group consisting of (a) Ti and (b) Cu, Co, Ni, and Zr. The doping element may include at least one of (c1) (CH3)4Si(tetra methyl silane, TMS) or (c2) Molybdenum (Mo).

Silicon (Si) in (c1) (CH3)4Si(tetra methyl silane, TMS) provides thermal resistance to the lubricating layer. Even though a temperature of the lubricating layer increases in a high speed rotational environment, the lubricating layer may maintain durability due to Si.

(c2) Mo may reduce a frictional coefficient of the lubricating layer to maximize the low friction characteristics of the lubricating layer, Mo may be combined with oxygen to generate lubricous oxide. In particular, Mo acts as a lubricating component in a high speed rotational environment.

Accordingly, a lubricating layer containing all of (a) Ti, (b) a metal phase and (a) Mo may have all of high hardness characteristics due to Ti, durability by a large elastic strain provided from the metal phase, thermal resistance due to Si, and low frictional characteristic due to Mo.

Figure 10:
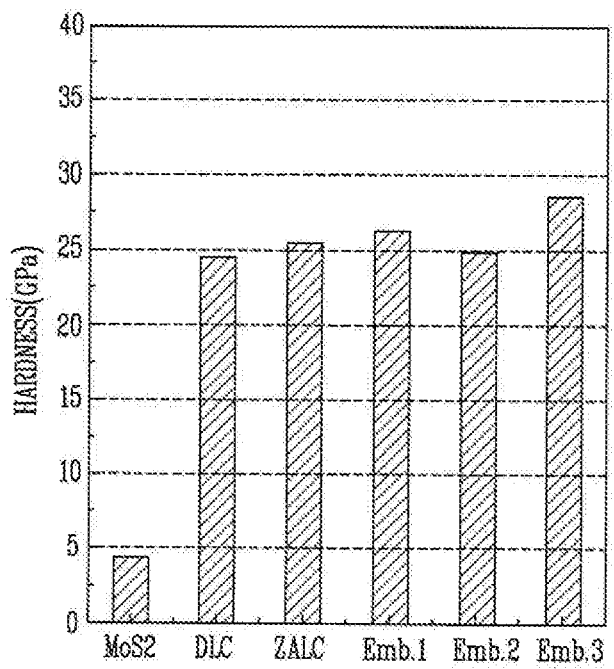
FIG. 10 is a graph in which a hardness of a lubricating layer according to embodiments disclosed herein is compared with a hardness of a lubricating layer in the related art.

FIG. 10 is a graph in which a hardness of a lubricating layer according to embodiments disclosed herein is compared with a hardness of a lubricating layer in the related art. Embodiments 1 to 3 illustrate a lubricating layer according to embodiments disclosed herein.

Embodiment 1 a lubricating layer consisting of Ti, Cu, and N. Embodiment 2 is a lubricating layer further including Ti, Cu, and N Embodiment 3 is a lubricating layer on which TMS is doped into Ti, Cu, and N.

Lubricating materials subject to comparison are MoS2, DLC (Diamond like Carbon), and ZALC. MoS2 is a Mo-based lubricating material. DLC (Diamond like Carbon) is a carbon-based lubricating material. ZALC is a lubricating material containing Zr, Al, and Cu.

Comparing hardnesses when the lubricating layers according to embodiments disclosed herein and lubricating materials subject to comparison are applied to a compressor, the lubricating layers according to embodiments disclosed herein have a hardness value superior to a hardness value of Mo-based lubricating materials. Further, it is seen from the graph that a hardness value of the lubricating layers according to embodiments disclosed herein is equal to or greater than a hardness value of DLC or ZALC.

Figure 11:
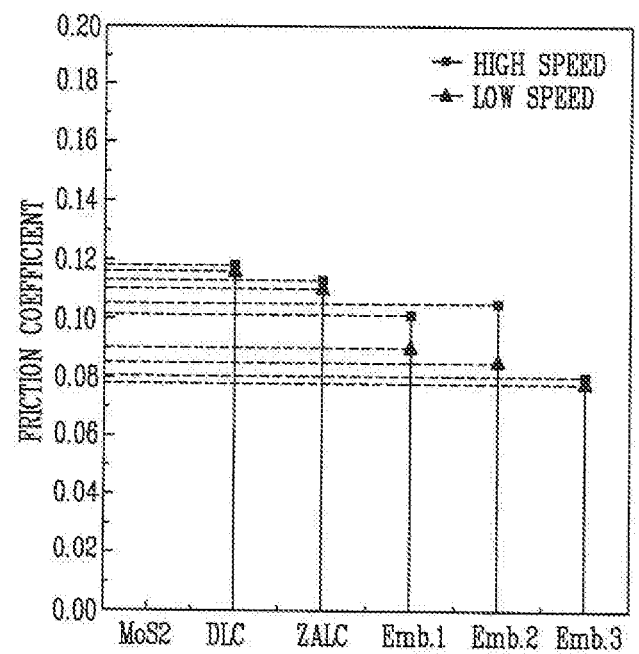
FIG. 11 is a graph in which steel is selected as a base material to evaluate friction characteristics on a lubricating layer according to an embodiment.

FIG. 11 is a graph in which steel is selected as a base material to evaluate friction characteristics on a lubricating layer according to embodiments disclosed herein. Embodiments 1 to 3 are the same as embodiments 1 to 3 respectively, in which their hardnesses are measured in FIG. 10. Lubricating materials subject to comparison are the same as those in FIG. 10.

Frictional characteristics are evaluated by their friction coefficients, and a low friction coefficient indicates maximization of a low friction characteristic capable of implementing an excellent lubricating operation. Referring to a friction coefficient measurement result of FIG. 11, it is seen that lubricating layers in embodiments 1 to 3 have lower friction coefficients compared to the lubricating layers subject to comparison. In particular, it is seen that embodiments 2 and 3 have more excellent low friction characteristics compared to embodiment 1, and exhibit low frictional characteristics maximized in a low speed rotational environment than a high speed rotational environment.

Figure 12:
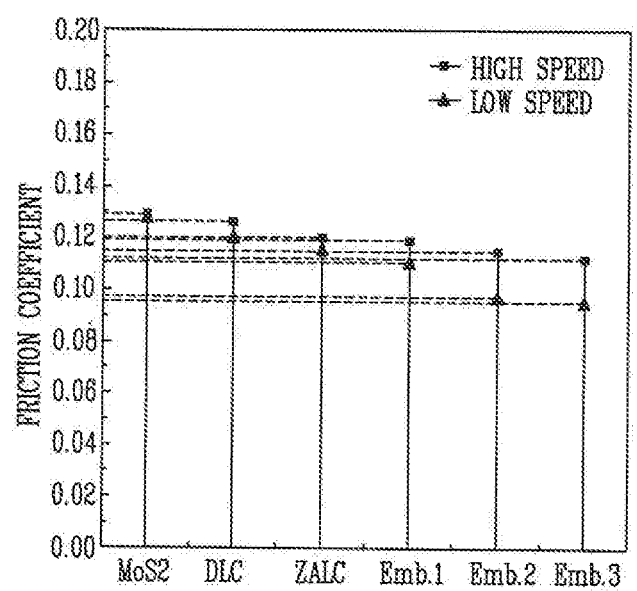
FIG. 12 is a graph in which cast iron is selected as a base material to evaluate friction characteristics on a lubricating layer according to an embodiment.

FIG. 12 is a graph in which cast iron is selected as a base material to evaluate friction characteristics on a lubricating layer according to embodiments disclosed herein. Embodiments 1 to 3 are the same as embodiments 1 to 3, respectively, in which their hardnesses are measured in FIG. 10. Lubricating materials subject to comparison are the same as those in FIG. 10.

A friction coefficient measurement result of FIG. 12 is substantially similar to the result of FIG. 11. It is seen from the drawing of FIG. 12 that lubricating layers in embodiments 1 to 3 have lower friction coefficients compared to the lubricating layers subject to comparison. In particular, in a case of embodiment 1, it has a lower friction coefficient compared to embodiment 2 when cast iron is selected as it material. It is similar to the result of FIG. 11 in that embodiments 2 and 3 have more excellent low friction characteristics compared to embodiment 1, and substantially exhibit low frictional characteristics maximized in a low speed rotational environment than a high speed rotational environment.

Hereinafter, a lubricating layer according to embodiments disclosed herein and a compressor having the same will be described.

Figure 13:
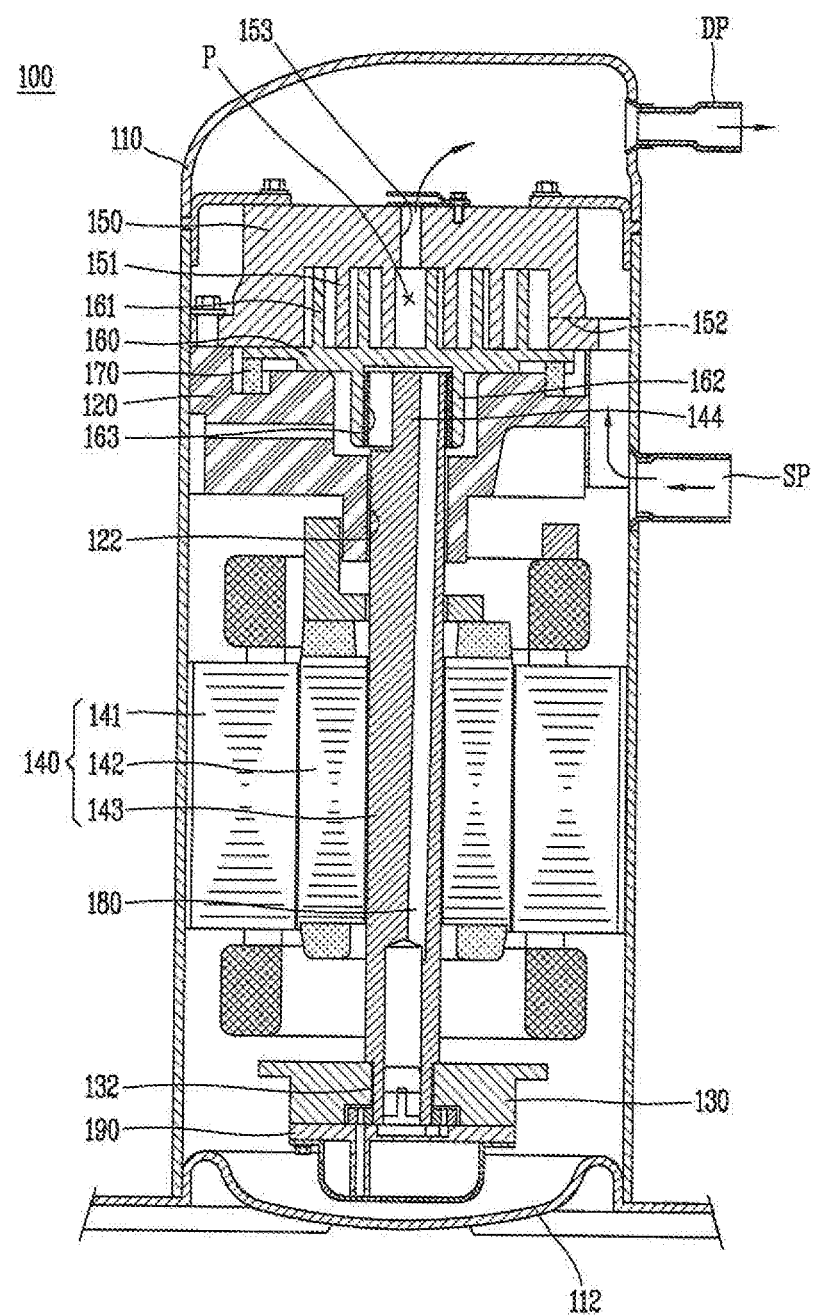
FIG. 13 is a cross-sectional view of a scroll compressor according to an embodiment.

FIG. 13 is a cross-sectional view of a scroll compressor according to embodiments disclosed herein. FIG. 13 shows a scroll compressor; however, embodiments are not limited thereto, and it should be understood by those skilled in the art that embodiments disclosed herein may be also applicable to any type of compressor.

Referring to FIG. 3, for the scroll compressor 100, a main 120 and a sub-frame 130 are provided within a sealed container 110, and a drive motor 140, which may be an electric motor, may be provided between the main frame 120 and the sub-frame 130, and a compression unit having a fixed scroll 150 and an orbiting scroll 160 coupled to the drive motor 140 to compress a refrigerant may be provided at an upper side of the main frame 190.

The drive motor 140 may include a stator 141, around which a coil may be wound, a rotor 142, into which the stator 141 may be rotatably inserted, and a rotational shaft 143 inserted at a center of the rotor 142 to transfer a rotational force to a compression mechanism. On the rotational shaft 143, a drive pin 144 may be eccentrically formed in a protruding manner with respect to a rotational center of the shaft 142 at an upper end thereof.

The compression mechanism may include the fixed scroll 150 fixed to an upper surface of the main frame 120, the orbiting scroll 160 provided an upper surface of the main frame 120 to be engaged with the fixed scroll 150, and an oldham ring 170 provided between the orbiting scroll 160 and the main frame 120 to prevent rotation of the orbiting scroll 160. A fixed wrap 151 spirally wound to form a compression chamber (P) along with an orbiting wrap 161, which will be described hereinafter, may be formed on the fixed scroll 150, and the orbiting wrap 161 spirally wound to form a compression chamber (P) in engagement with the fixed wrap 151 may be formed on the orbiting scroll 160. Further, a boss 162 coupled to the rotational shaft 143 to receive a rotational force may be formed in a protruding manner on an opposite lateral surface of the orbiting wrap 161.

A first coating layer 163 provided to face an outer circumferential surface of the drive pin 144 of the rotational shaft 143 may be formed within the boss 162 of the orbiting scroll 160. The first coating layer 163 may be formed on an inner surface of the boss 162 to perform a role of reducing a friction between the rotational shaft 143 and the orbiting scroll 160.

Further, a second coating layer 122 may be formed at an inner side of the main frame 120 to reduce a friction between the rotational shaft 142 and the main frame 120, and third coating layer 132 may be provided at an inner side of the sub-frame 130. Oil may be supplied to the first through the third coating layer 163, 122, 132 to provide an efficient lubricating operation.

When power is applied to the drive motor 140 to rotate the rotational shaft 143, the orbiting scroll 160 eccentrically coupled to the rotational shaft 143 may perform an orbiting movement along a predetermined trajectory, and the compression chamber (P) formed between the orbiting scroll 160 and the fixed scroll 150 may be reduced in volume while continuously moving to a center of the orbiting movement to continuously inhale, compress, and discharge a refrigerant.

An appropriate amount of oil should be supplied to reduce a friction generated between each component of the compression unit during this process, and the oil may be injected and stored in a base 112 of the sealed container 110. The injected oil may be supplied to an inside of the compression unit and the first through the third coating layer 163, 122, 132 through an oil passage 180 formed within the rotational shaft 143. On the drawing, reference numerals 152, 153, 190, SP, and DP indicate a suction port, a discharge port, an oil pump cover, suction pipe, and a discharge pipe, respectively.

In a case of a scroll compressor in the related art, a ring type journal bearing is used in place of the first through the third coating layer, and they have a thickness of about 2 mm. In a case of the first through the third coating layer, it may be possible to obtain sufficient wear resistance and lubricating effect with a thickness less than about 0.1 mm, thereby providing similar wear resistance even with a very low thickness compared to the related art.

The reduced thickness may allow a decrease in size of the scroll compressor 100, and may be used to provide a higher compression ratio with respect to a same size. Moreover, in a case of the scroll compressor 100, a back pressure should be applied to a rear surface of the orbiting scroll to prevent the orbiting scroll from being pulled back due to a gas pressure. The back pressure may be applied by introducing a portion of compression gas existing within the compression chamber, and in a case of using a bearing in the related art, it is often difficult to increase a size of the bearing to a desired extent due to such a back pressure supply structure; however, according to the above embodiment, it may be possible to remove such a restriction of design.

On the other hand, embodiments disclosed herein may be also applicable to a so-called "shaft through" type compressor in which a main frame is omitted and a fixed scroll performs the role of the main frame. The term "shaft through" is used in consideration that the rotational shaft is inserted through an end plate of the fixed scroll. Another embodiment of the scroll compressor in which embodiments disclosed herein may be applied to such a shaft through scroll compressor is illustrated in FIG. 14.

Figure 14:
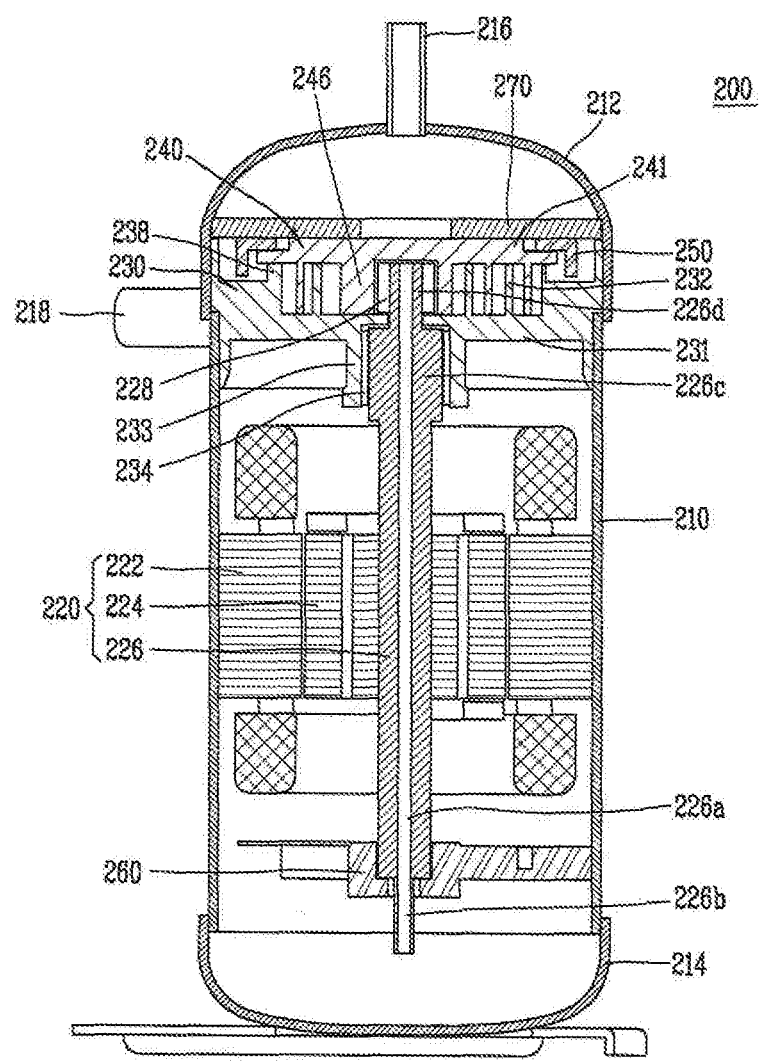
FIG. 14 is a cross-sectional view of a scroll compressor according to another embodiment.

FIG. 14 is cross-sectional view of a scroll compressor according to another embodiment. Referring to FIG. 14, the scroll compressor 200 may include a casing 210 including an upper shell 212 and a lower shell 214. The upper shell 212 and lower shell 214 may be, for example, welded to the casing 210 to form a closed space along with the casing 210.

A discharge pipe 216 may be provided at an upper portion of the upper shell 212. The discharge pipe 216 may correspond to a path through which compressed refrigerant may be discharged to an outside thereof, and an oil separator (not shown) that separates an oil mixed with the discharged refrigerant may be connected to the discharge pipe 216. Further, a suction pipe 218 may be provided on a lateral surface of the casing 210. The suction pipe 218 may be a path through which refrigerant to be compressed may be introduced, and the suction pipe 218 may be located on a boundary surface between the casing 210 and the upper shell 212 in FIG. 14; however, embodiments are not limited thereto. Moreover, the lower shell 214 may function as an oil chamber that stores oil supplied to efficiently operate the compressor.

A motor 220 as a drive may be provided at a substantially central portion within the casing 210. The motor 220 may include a stator 222 fixed to an inner surface of the casing 210, and a rotor 224 located within the stator 222 to rotate by an interaction with the stator 222. A rotational shaft 226 may be provided at a center of the rotor 224, thereby allowing the rotor 224 and rotational shaft 226 to rotate at a same time.

An oil passage 226a may be formed at a central portion of the rotational shaft 226 to extend along a lengthwise direction of the rotational shaft 226, and an oil pump 226b that supplies the oil stored in the lower shell 214 to an upper portion thereof may be provided at a lower end portion of the rotational shaft 226. For the oil pump 226b, a spiral groove may be formed within the oil passage 226a, or an additional impeller may be provided, or an additional positive displacement pump may be provided.

An enlarged portion 226c inserted into a boss formed on a fixed scroll 230, which will be described hereinafter, may be provided at an upper end portion of the rotational shaft 226. The enlarged portion 226c may be formed to have a large diameter compared to other portions thereof, and a pin 226d may be formed at an end portion of the enlarged portion 226c. An eccentric bearing layer 228 may be located at the pin 22d.

The fixed scroll 230 may be mounted on a boundary portion between the casing 210 and the upper shell 212. The fixed scroll 230 may be pressed and fixed in a shrink fitted manner between the casing 210 and the upper shell 212 or coupled to the casing 210 and upper shell 212 by welding, for example.

A boss 233, into which the rotational shaft 226 may be inserted, may be formed on a lower surface of the fixed scroll 230. A through hole allowing the pin 226d of the rotational shaft 226 to pass therethrough may be formed on an upper surface (refer to FIG. 14) of the boss 233, and the pin 226d may protrude therethrough in an upward direction of an end plate 231 of the fixed scroll 230. Further, a first coating layer 234 to reduce a friction with the rotational shaft 226 may be formed on an inner surface of the boss 233.

A fixed wrap 232 coupled with an orbiting wrap 242, which will be described hereinafter, to form a compression chamber may be formed on an upper surface of the end plate 231, and a side wall 238 in contact with an inner circumferential surface of the casing 210 to form a space to accommodate an orbiting scroll 240, which will be described hereinafter, may be formed on an outer circumferential portion of the end plate 231.

The orbiting scroll 240 may be provided at an upper portion of the fixed scroll 230. The orbiting scroll 240 may be formed with an end plate 241 having a substantially circular shape and the orbiting wrap 242 coupled with the fixed wrap 232. Further, a substantially circular rotating shaft coupling portion 246 rotatably inserted and fixed to the eccentric bearing layer 228 may be formed at a central portion of the end plate 241. An outer circumferential portion of the rotating shaft coupling portion 246 may be connected to the orbiting wrap 242 to perform a role of forming the compression chamber along with the fixed wrap 232 during the compression process.

On the other hand, the eccentric bearing layer 228 may be formed on the rotational shaft coupling portion 246, and thus, an end portion of the rotational shaft 226 may be inserted through the end plate 231 of the fixed scroll 230, and the orbiting wrap 242, fixed wrap 232, and eccentric bearing layer 228 may be provided to overlap with one another in a lateral direction of the compressor. During compression, a repulsive force of the refrigerant may be applied to the fixed wrap 232 and the orbiting wrap 242, and a compression force may be applied between the rotational shaft supporting portion 246 and the eccentric bearing layer as a reaction force thereto. When a portion of the rotational shaft 226 passes through the end plate 231 to overlap with the wrap as described above, the repulsive force and compression force of the refrigerant may be applied to a same lateral surface based on the end plate, and thus, cancelled out by each other. As a result, it may be possible to prevent the orbiting scroll 240 from being tilted due to the action of the compression force and repulsive force.

Further, though not shown in the drawing, a discharge hole may be formed on the end plate 241 to discharge compressed refrigerant to an inside of the casing. A location of the discharge hole may be discretionally set in consideration of a required discharge pressure, for example.

Furthermore, an oldham ring 250 that presents the rotation of the orbiting scroll 240 may be provided at an upper side of the orbiting scroll 240. A lower frame 260 that rotatably supports a lower side of the rotational shaft 226 may be provided at a lower portion of the casing 210, and an upper frame 270 that supports the orbiting scroll 240 and the oldham ring 250, respectively, may be provided at an upper portion of the orbiting scroll 240. A hole that communicates with the discharge hole of the orbiting scroll 240 to discharge the compressed refrigerant to a side of the upper shell 212 may be formed at a center of the upper frame 270.

According to this embodiment, the eccentric bearing layer 228 and the first coating layer 234 may have a same structure and material as those of the previous embodiment. In particular, according to this embodiment, a rotational shaft coupling portion may be located at a central portion of the orbiting scroll 240 to drastically reduce a space to be used as a compression space of the end plate 231 of the orbiting scroll 240. Accordingly, in a case of the shaft through type scroll compressor 200, a size thereof should be increased to obtain a same compress on ratio compared to other compressors, but according to embodiments disclosed herein, a thickness of the coating layer may be drastically reduced compared to the related art, thereby minimizing an increase is size thereof.

Figure 15:
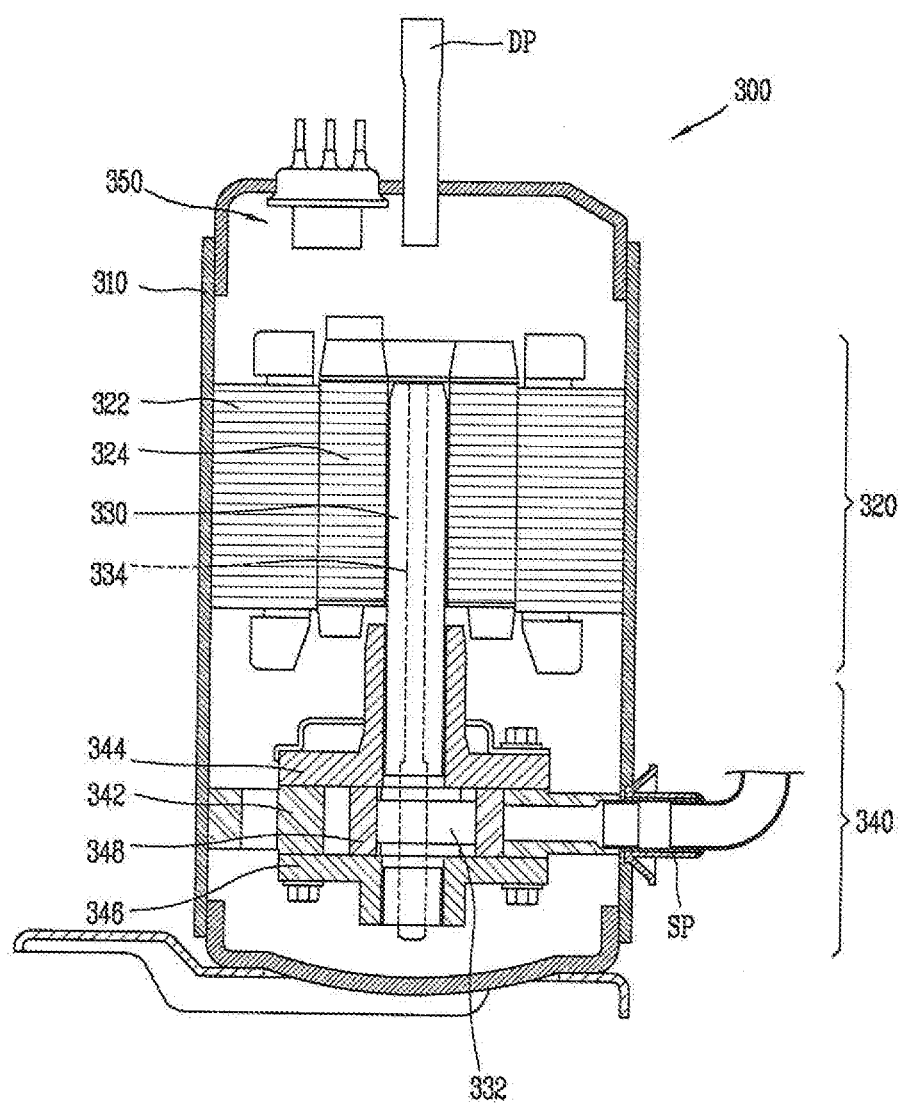
FIG. 15 is a cross-sectional view of a rotary compressor according to an embodiment.

FIG. 15 is a cross-sectional view of a rotary compressor according to another embodiment. As illustrated in FIG. 15, the rotary compressor 300 according to this embodiment may include a casing 310 filled with oil therein and provided with a discharge pipe (DP) and a suction pipe (SP), a drive motor 320 provided within the casing 310 to generate a driving force, a compression mechanism 340 driven by the drive motor 320 to compress a refrigerant gas, and a crank shaft 330 configured to transfer a driving force from the drive motor 320 to the compression mechanism 340.

The casing 310 may be provided with the discharge pipe (DP) passing through a wall surface of the casing 310 at an upper portion thereof, and with the suction pipe (SP) communicating with the compression mechanism 340 through a wall surface of the casing 310 at a lower portion thereof. Further, the casing 310 may be provided with a cluster block 350 that connects the drive motor 320 and an external power source in a conducting manner at an upper portion thereof.

The drive motor 320 may include a stator 322 fixed to the casing 310 and a rotor 324 inserted into the stator 322 with a predetermined gap therebetween to be rotated by a interaction with the stator 322. The rotor 324 may be coupled to an end portion of the crank shaft 330.

The crank shaft 330 may be provided with an eccentric portion 332 eccentrically formed with respect to the rotational shaft of the crank shaft 330 at the other end portion thereof. The other end portion of the crank shaft 330 may pass through a first bearing 344 and a second bearing 346, which will be described hereinafter, and the eccentric portion 332 may be provided within a compression space, which will be described hereinafter. The crank shaft 330 may be supported by the first bearing 344 and second bearing 346. Further, the crank shaft 330 may be formed such that an oil passage 334 may pass therethrough in an elongated manner in an axial direction therein. An oil feeder (not shown) that pumps an oil filled in the casing 310 may be coupled to a lower portion of the oil passage 334.

The compression mechanism 340 may include a circular shaped cylinder 342 fixed to an inner circumferential surface of the casing 310 to communicate with the suction pipe (SP), the first bearing 344 and the second bearing 346 (hereinafter, referred to as "bearings") configured to form a compression space along with the cylinder 342, a rolling piston 348 coupled to the eccentric portion 332 of the crank shaft 330 to eccentrically rotate within the compression space, and a vane (not shown) pressed on an outer circumferential surface of the rolling piston 348 to partition the compression space into a suction space and a discharge space while performing a linear movement during the orbiting movement of the rolling piston 348. When power is applied to the drive motor, the rotary compressor according to this embodiment may rotate the rotor 324 and the crank shaft 330. The rolling piston 348 may be eccentrically rotated within the compression space by the rotation of the crank shaft 330. The vane (not shown) may partition the compression space into a suction space and a compression space while a linear movement is carried out by the rotation of the rolling piston 348. Refrigerant flowing into the compression space through the suction pipe (SP) may be compressed by the movement of the rolling piston 348 and the vane (not shown) and discharged to the discharge pipe (DP). As the crank shaft 330 is brought into contact with the first bearing 344 and second bearing 346 in a sliding manner, a surface state of the crank shaft 330 may be very important in reducing a friction loss of the compressor.

In consideration of this, the foregoing coating layer ray be formed on the crank shaft 330, the first bearing 344, and the second bearing 348. Otherwise, a buffer layer may be formed on an outer circumferential surface of a base material, and the coating layer may be formed on an outer circumferential surface of the buffer layer.

Accordingly, the coating layer may prevent an efficiency reduction of the rotary compressor 300 due to basic high hardness and lower frictional characteristics, and prevent the crank shaft 330 from being damaged on a portion in contact with the bearings 344, 346. In addition, the coating layer may maintain low frictional characteristics even when lubrication due to an oil film is not efficiently carried out to prevent an efficiency reduction of the compressor, and prevent the crank shaft 330 from being damaged at a portion in contact with the bearings 344, 346.

A case in which lubrication due to an oil film is not efficiently carried out may occur when the compressor is in a state of being immediately subsequent to an initial activation, a state of being operated at a high load and low speed, a state in which liquid refrigerant is introduced, a state n which activation is suspended, for example, or when an amount of oil is insufficient at a contact portion between the crank shaft 330 and the bearings 344, 346 or an oil viscosity is insufficient.

In this case, a coating layer according to this embodiment is applicable to the crank shaft 330 and bearings 344, 346 of the rotary compressor 300, but also applicable to other components. For example, the coating layer may be also applicable to a frictional portion such as the cylinder 343, the rolling piston 348, and the vane (not shown) of the rotary compressor 300.

According to embodiments disclosed herein, a composition of a lubricating layer may have a glass forming ability, thereby obtaining a composite structure containing an amorphous material. In general, as a hardness and an elastic coefficient thereof tend to increase together or decrease together, a high hardness phase has a relatively large coefficient, and a soft low hardness phase has a relatively small coefficient. However, an amorphous material has a low elastic coefficient value while having a larger hardness than a hardness of the low hardness phase. For formation of a lubricating layer, a composite structure of a nitride and/or a carbide having high hardness and high elastic coefficient characteristics is unavoidable, but when the composite structure of a nitride and/or a carbide is formed, a relatively low elastic coefficient value may be provided while maintaining a relatively large hardness value. A low elastic coefficient value of the lubricating layer given by an amorphous material may be similar to an elastic coefficient value of a base metal, and therefore, the lubricating layer according to embodiments disclosed herein may be prevented from being peeled off from the base material or destroyed and may enhance reliability (durability) on wear resistance as well as the wear resistance of the lubricating layer.

Further, according to embodiments disclosed herein, a lubricating layer may have a composite structure containing nanocrystalline grains in which a soft metal is structuralized, thereby making up for a problem in which a hardness decreases as a ratio of the metal phase increases due to a reinforcing effect of the nanocrystalline grains. In addition, according to embodiments disclosed herein, a soft metal may improve conditioning characteristics of the lubricating layer to reduce a conditioning time, and enhance thermal resistance due to Si doping, and maximize low frictional characteristics due to Mo doping.

Embodiments disclosed herein provide a compressor having a lubricating layer with an enhanced durability compared to the related art. Embodiments disclosed herein further provide a compressor having a lubricating layer with for friction, heat resistance, and conditioning characteristics compared to the related art.

A compressor according to embodiments disclosed herein may include a lubricating layer coated on a frictional portion between a rotational shaft and a bearing. The lubricating layer may include at least one metal phase selected from a group consisting of (a) Ti and (b) Cu, Co, Ni and Zr, and may have a composite structure of amorphous and nanocrystalline materials. According to one embodiment, the lubricating layer may include (b1) Cu and a ratio of the (a) Ti and the (b1) Cu may be Ti:Cu=75.6:24.4 at. % to Ti:Cu=55:45 at. % to form the amorphous material.

According to another embodiment, the lubricating layer may include (b2) Co, and a ratio of the (a) Ti and the (b2) Co may be Ti:Co=83:17 at. % to Ti:Co=24.2:75.8 at. % to form the amorphous material. According to still another embodiment, the lubricating layer may include (b3) Ni, and a ratio of the (a) Ti and the (b3) Ni may be TrNi=82:18 at. % to Ti:Ni=49:61 at. % to form the amorphous material. An elastic strain ratio of the amorphous material may be above 1.5%.

The lubricating layer may further include (c1) (CH3)4Si (tetra methyl silane, TMS). The lubricating layer may further include (c2) Mo. Tire nanocrystalline material may further include at least one of (d1)) N or (d2) C. The (d1) N may form Ti nitride along with the (a) Ti, and the (d2) C may form Ti carbide along with the (a) Ti. The Ti nitride may include TiN, and the Ti carbide may include TiC.

The nanocrystalline material may further include (d1) N and (d2) C. The (d1) N and (d2) C may form TiNC along with the (a) Ti.

A base material coated with the lubricating layer may include at least one of an alloy containing steel, cast iron, aluminium, or an alloy containing magnesium. The amorphous and the nanocrystalline materials may be sequentially deposited on a base material.

The compressor as described above is not limited to configurations and methods of the foregoing embodiments, and all or part of each embodiment may be selectively combined and configured to make various modifications thereto.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fail within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor, comprising:
   a lubricating layer coated either on a rotational shaft or a bearing configured to rotate relatively with respect to the rotational shaft, wherein the lubricating layer includes:
   Titanium (Ti); and
   at least one metal phase selected from a group consisting of Copper (Cu), Cobalt (Co), Nickel (Ni), and Zirconium (Zr), wherein the lubricating layer has a composite structure of amorphous and nanocrystalline materials, and wherein an atomic ratio of the Ti and the Cu is Ti:Cu=75.6:24.4 at. % to Ti:Cu=55:45 at. % to form the amorphous material when the lubricating layer includes the Cu, an atomic ratio of the Ti and the Co is Ti:Co=83:17 at. % to Ti:Co=24.2:75.8 at. % to form the amorphous material when the lubricating layer includes the Co, and an atomic ratio of the Ti and the Ni is Ti:Ni=82:18 at. % to Ti:Ni=49:61 at. % to form the amorphous material when the lubricating layer includes the Ni.

2. The compressor of claim 1, wherein an elastic strain ratio of the amorphous material is above about 1.5%.

3. The compressor of claim 1, wherein the lubricating layer further includes (CH3)4Si (tetra methyl silane, TMS).

4. The compressor of claim 1, wherein the lubricating layer further includes Molybdenum (Mo).

5. The compressor of claim 1, wherein the nanocrystalline material further includes at least one of Nitrogen (N) or Carbon (C), and wherein the N forms Ti nitride along with the Ti, and the C forms Ti carbide along with the Ti.

6. The compressor of claim 5, wherein the Ti nitride includes TiN, and the Ti carbide includes TiC.

7. The compressor of claim 1, wherein the nanocrystalline material further includes Nitrogen (N) and Carbon (C), and wherein the N and the C form TiNC along with the Ti.

8. The compressor of claim 1, wherein a base material coated with the lubricating layer includes at least one of an alloy containing steel, cast iron, aluminium, or an alloy containing magnesium.

9. The compressor of claim 1, wherein the amorphous and the nanocrystalline materials are sequentially deposited on a base material.

10. A compressor, comprising:
a drive including a rotational shaft;
a compression mechanism, wherein a drive force is transferred by the rotational shaft from the drive to the compression mechanism to compress a refrigerant;
at least one bearing that supports the rotational shaft; and
at least one lubricating layer provided either on the rotational shaft or the at least one bearing configured to rotate relatively with respect to the rotational shaft, wherein the lubricating layer includes:
Titanium (Ti); and
at least one metal phase selected from a group consisting of Copper (Cu), Cobalt (Co), Nickel (Ni), and Zirconium (Zr), and wherein an atomic ratio of the Ti and the Cu is Ti:Cu—75.6:24.4 at. % to Ti:Cu=55:45 at. % to form an amorphous and nanocrystalline material when the lubricating layer includes the Cu, an atomic ratio of the Ti and the Co is Ti:Co=83:17 at. % to Ti:Co=24.2:75.8 at. % to form the amorphous material when the lubricating layer includes the Co, and an atomic ratio of the Ti and the Ni is Ti:Ni=82:18 at. % to Ti:Ni=49:61 at. % to form the amorphous material when the lubricating layer includes the Ni.

11. The compressor of claim 10, wherein the nanocrystalline material further includes at least one of Nitrogen (N) or Carbon (C), and wherein the N forms Ti nitride along with the Ti, and the C forms Ti carbide along with the Ti.

12. The compressor of claim 10, wherein the nanocrystalline material further includes Nitrogen (N) and Carbon (C), and wherein the N and the C form TiNC along with the Ti.

13. The compressor of claim 10, wherein the compressor is a scroll compressor.

14. The compressor of claim 10, wherein the compressor is a rotary compressor.

* * * * *